United States Patent [19]

Callender

[11] Patent Number: 4,682,389
[45] Date of Patent: Jul. 28, 1987

[54] GARMENT CONNECTOR

[76] Inventor: Robert J. Callender, 7420 Hidden Valley Pl., Roseville, Calif. 95678

[21] Appl. No.: 931,107

[22] Filed: Nov. 17, 1986

[51] Int. Cl.4 .................................... A44B 13/00
[52] U.S. Cl. ................................ 24/599; 24/614; 24/618; 24/DIG. 29
[58] Field of Search ............... 24/599, 614, 618, 615, 24/621, 460, 461, 462, DIG. 29; 2/239

[56] References Cited

U.S. PATENT DOCUMENTS

| | | | |
|---|---|---|---|
| 1,975,000 | 9/1934 | Beaumont et al. | 24/460 |
| 2,016,733 | 10/1935 | Wener | 24/599 |
| 2,089,221 | 8/1937 | Patur et al. | 24/460 |
| 3,041,743 | 7/1962 | Monsma | 24/DIG. 29 |
| 3,699,617 | 10/1972 | Hofmeister | 24/599 |
| 4,110,873 | 9/1978 | Verchere | 24/618 |
| 4,165,555 | 8/1979 | Boxer et al. | 24/DIG. 29 |
| 4,369,553 | 1/1983 | Yuda | 24/618 |

Primary Examiner—Victor N. Sakran
Attorney, Agent, or Firm—Henderson & Sturm

[57] ABSTRACT

A multi-piece garment connector is provided for interconnecting related garments or the like so as to prevent accidental separation of one from the other, as during laundering. The connector comprises male and female elements connectible temporarily to related garments such as a pair of hose, each element being provided with a simple attachment device, and the two elements are interconnected by fitting a tongue-like part on one element into a cavity in the other element. Cooperative parts of the elements provide a detent function operative normally to prevent withdrawal of the tongue from the cavity but yieldable to manual force to separate the cooperative detent portions as to enable such withdrawal.

2 Claims, 6 Drawing Figures

GARMENT CONNECTOR

BACKGROUND AND SUMMARY OF THE INVENTION

The present invention is a modification of that forming the subject matter of my co-pending application Ser. No. 813,368, filed Dec. 26, 1985, and its principal utility is found in its use to interconnect a pair of garments or garment-related parts, the simplest example being a pair of stockings, socks or similar paired articles so as to prevent loss of one or the other during a treating process such as laundering, for example. The concept involves the provision of a pair of mating elements so configured that the tongue of one fits the cavity of the other, and the elements are detented so that manual force of substantial magnitude is required to effect withdrawal of the tongue from the cavity. The elements are formed of suitable material, such as plastic which has the characteristics of water resistance, dimensional stability, low cost and fairly stiff but yieldable as respects the detent function. Besides fitting or interlocking with each other, each element has an attachment portion capable of being temporarily or otherwise affixed to a garment.

Further objects, features and advantages will become apparent as a preferred embodiment of the invention is disclosed in detail in the ensuing description and accompanying drawing.

DETAILED DESCRIPTION OF A PREFFERED EMBODIMENT OF THE INVENTION

Figure 1:
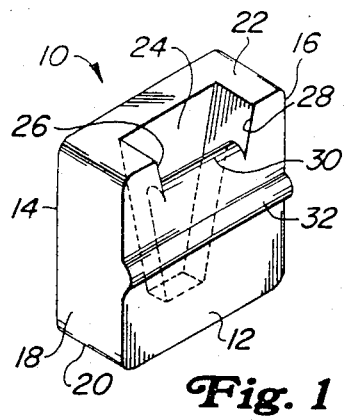
FIG. 1 is a perspective of one element.
Figure 2:
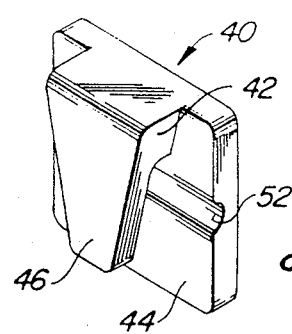
FIG. 2 is a perspective of the cooperative element.
Figure 3:
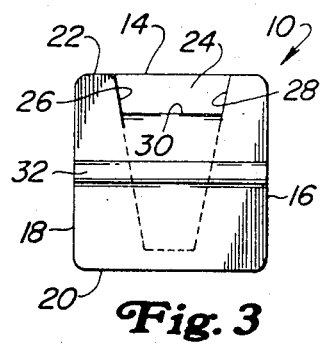
FIG. 3 is a face or front view of the FIG. 1 element.
Figure 4:
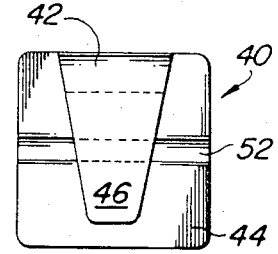
FIG. 4 is a face or front view of the FIG. 2 element.

FIG. 1 best shows the first or female element, denoted in its entirety by the numeral 10, preferably composed of a suitable material such as plastic for its ability to resist corrosion and its quality of at least some inherent flexibility for purposes to appear later. The element may be substantially a parallel piped in overall configuration, having a front wall 12, a rear wall 14, opposite sides 16 and 18, a bottom 20 and a top 22. The walls and sides become walls by virtue of the formation in the element of a top-opening cavity 24 having downwardly convergent sides 26 and 28, giving the cavity a wedge-shaped form. An upper portion of the front wall is cut away or otherwise formed so that this wall terminates short of the top of the element, as at 30. The front face of the front wall is formed with a rib 32 transverse to the vertical dimension of the element. This rib forms a detent portion for detent means to be described subsequently.

Figure 6:
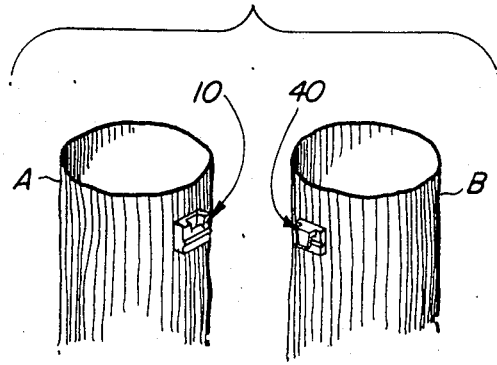
FIG. 6 is a reduced-scale view, with portions broken away to conserve space, showing a representative use of the interconnected elements.

Projecting from the back face of the back wall 14 is a stud 34 having a rounded head 36 by means of which the element may be attached to one of pair of sock A and B, for example (FIG. 6). The stud penetrates the weave of the one sock A and a plastic, distortable washer 38 or similar part is snapped over the stud head.

Figure 5:
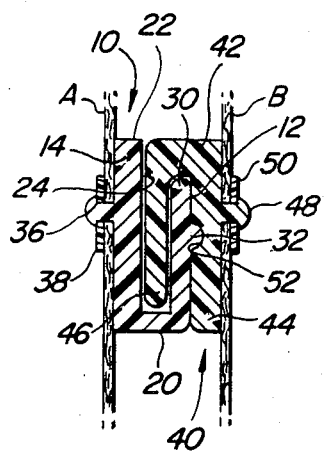
FIG. 5 is a sectional view of the assembled elements.

The second or male element may be constructed of the same material used for the FIG. 1 element. The second element is essentially in the form of an inverted U having a bight 42 and a pair of legs, one of which provides a rear or back wall 44 and the other serves as a front wall or tongue 46. The rear of the back wall is formed with a round-headed stud 48 for affixation of the element to the sock B, supplemented by a washer 50 like that described for the element 10. The tongue is tapered downwardly on the order of the convergent shape of the cavity in the element 10 and in assembly, the tongue is received by and relatively snugly fits the cavity. The front face of the back wall 44 has a groove 52, which forms the other detent portion that cooperates with the rib 32 on the element 10. Also to be observed is that the top 30 of the front wall of the element 10 is purposely disposed below the basic top of the element by an amount enabling accommodation of the thickness of the bight or top part of the element 40. See FIG. 5. This enables the top parts of the assembled element to lie flush and to eliminate possible snagging with other articles in the laundering (for example) process.

In use, the elements are respectively attached to socks A and B, for example, by the headed studs and washers described above. The elements are interconnected by simply sliding the tongue 46 downwardly into the cavity 24. There is sufficient flexibility or resilience in the bight 42 as to act as a "hinge" so as to enable the groove 52 in the element 40 to slide over and lock up with the rib 32, thus forming detent means resisting upward separation of the tongue from the cavity. At the same time, this resiliency enables a user to apply sufficient manual force to the back of the element 40 to flex the bight 42 in "hinge" fashion so as to free the groove 52 from the rib so that the elements can be upwardly separated.

Features and advantages not specifically pointed out above will become apparent to those versed in the art, as will may modifications in the preferred embodiment disclosed, all without departing from the spirit and scope of the invention.

I claim:

1. A garment connector comprising a first block-like element having a top, a bottom, opposite sides and front and rear walls and including a cavity opening at the top and extending downwardly between the sides and walls, a second block-like element of inverted U-shaped configuration having a top bight and a pair of legs depending from the bight, one of the legs providing a back wall and the other leg providing a tongue downwardly insertable into and upwardly removable from the cavity in the first element, the tongue being spaced forwardly from the back wall a distance on the order of the thickness of the first element front wall and the tongue being further shaped and dimensioned so as to relatively tightly fit the cavity, detent means yieldingly resisting upward separation of the second element from the first element, including cooperation engageable and disengageable portions respectively on the front wall of the first element and on the back wall of the second element, one detent portion comprising a rib integral with one element and extending crosswise as respects the line of tongue insertion and removal and the other detent portion being a groove formed in the other element and configured to receive the rib when the detent portions are engaged, and first and second means respectively on the elements for attachment of the respective elements to separate garments.

2. The connector of claim 1, in which the bight is biased to cause the detent portion on the back wall of the second element to engage the detent portion on the first element but is yieldable to manual force applied to the back wall in the direction away from the tongue to enable the back wall portion of the detent means to separate from its cooperative detent portion on the first element.

* * * * *